United States Patent
Xu et al.

(10) Patent No.: US 11,346,330 B1
(45) Date of Patent: May 31, 2022

(54) ADDITIVELY MANUFACTURED COMPONENTS FOR ELECTRIC PROPULSION THRUSTERS

(71) Applicant: Board of Trustees of the University of Alabama, for and on behalf of the University of Alabama in Huntsville, Huntsville, AL (US)

(72) Inventors: Kunning Gabriel Xu, Brownsboro, AL (US); Ethan Paul Hopping, Clinton, TN (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 158 days.

(21) Appl. No.: 16/111,840

(22) Filed: Aug. 24, 2018

Related U.S. Application Data

(60) Provisional application No. 62/549,727, filed on Aug. 24, 2017.

(51) Int. Cl.
*F03H 1/00* (2006.01)
*H05H 1/54* (2006.01)
(Continued)

(52) U.S. Cl.
CPC ............ *F03H 1/0075* (2013.01); *H05H 1/54* (2013.01); *B33Y 10/00* (2014.12); *B33Y 70/00* (2014.12);
(Continued)

(58) Field of Classification Search
CPC .... F03H 1/0068; F03H 1/0075; F03H 1/0062; F03H 1/00; H01J 27/146; H01J 27/143; B64G 1/405
See application file for complete search history.

(56) References Cited

U.S. PATENT DOCUMENTS 6,215,124 B1 *  4/2001  King ..................... F03H 1/0075
                                                          250/423 R
6,612,105 B1 *  9/2003  Voigt .................... F03H 1/0012
                                                          60/202
(Continued)

FOREIGN PATENT DOCUMENTS

EP     0778415 B1    10/2007

OTHER PUBLICATIONS

Colorado State University (CSU) "Hall Effect Thrusters" (Year: 2016).*

(Continued)

*Primary Examiner* — Arun Goyal
*Assistant Examiner* — William L Breazeal
(74) *Attorney, Agent, or Firm* — Maynard Cooper & Gale, P. C.; Brian T. Sattizahn

(57) ABSTRACT

A Hall effect thruster is provided having one or more components fabricated using additive manufacturing techniques. Additive manufacturing can be used to fabricate the propellant distributor and the discharge channel of the thruster. The propellant distributor can be separated from the anode of the thruster and can form the base of the discharge channel. The discharge channel can be detachably connected to the propellant distributor using one of a threaded connection or a snap-fit connection. The discharge channel can have an annular shape and electromagnets and magnetic poles can be placed in the surrounding areas of the discharge channel.

28 Claims, 6 Drawing Sheets

(51) Int. Cl.
 *B33Y 80/00* (2015.01)
 *B33Y 10/00* (2015.01)
 *B33Y 70/00* (2020.01)

(52) U.S. Cl.
 CPC ........... *B33Y 80/00* (2014.12); *F05B 2230/20* (2013.01); *F05B 2280/2004* (2013.01); *F05B 2280/4003* (2013.01)

(56) References Cited

U.S. PATENT DOCUMENTS

| | | |
|---|---|---|
| 7,500,350 B1 | 3/2009 | Jaconsen et al. |
| 7,624,566 B1 | 12/2009 | Manzella et al. |
| 9,934,929 B1 | 4/2018 | Martinez et al. |
| 2013/0200219 A1* | 8/2013 | Marchandise ......... B64G 1/405 244/171.1 |
| 2016/0265517 A1 | 9/2016 | Goebel |

OTHER PUBLICATIONS

Klahn "Design Guidelines for Additive Manufactured Snap-Fit Joints" (Year: 2016).*

* cited by examiner

ADDITIVELY MANUFACTURED COMPONENTS FOR ELECTRIC PROPULSION THRUSTERS

CROSS-REFERENCE TO RELATED APPLICATIONS

This application claims the benefit of U.S. Provisional Application No. 62/549,727, filed Aug. 24, 2017 and entitled "Design and Performance of a Hall Effect Thruster with Additively Manufactured Components," which application is hereby incorporated by reference in its entirety.

STATEMENT REGARDING FEDERALLY SPONSORED RESEARCH OR DEVELOPMENT

This invention was made with Government support under contract NNX15I5AJ18H awarded by the National Aeronautics and Space Administration. The Government has certain rights in the invention.

BACKGROUND

The present application generally relates to electric propulsion thrusters, such as a Hall effect thruster, that can have one or more components built using additive manufacturing (or 3D printing) techniques.

In traditional Hall effect thruster manufacturing, the fabrication of the anode and discharge channel assemblies can incur significant cost and manufacturing time. In most Hall effect thrusters, the propellant distributor is integrated into the metal anode assembly, necessitating manual fabrication and welding processes to integrate the baffle assemblies, orifices, and other assemblies of the propellant distributor into the anode. Further, the discharge channel assemblies of most Hall effect thrusters are manufactured from boron nitride, a hot-pressed ceramic that must be subtractively machined to obtain the annular channel geometry. Monolithic boron nitride dimensions are currently limited by the hot-pressing process, and make the design of larger thrusters challenging. In addition, the cost of the boron nitride components increases substantially with increased thruster size.

Subtractive manufacturing limits the geometries and internal features of the Hall effect thruster or other electric propulsion thrusters. Traditional manufacturing and assembly also requires a higher number of parts and assemblies to electrically isolate, thermally isolate, and/or mechanically hold the components of the thruster, which can drive up the complexity, assembly time, and cost of the thruster.

SUMMARY

The present application generally pertains to electric propulsion thrusters that can have one or more components of the thruster fabricated using additive manufacturing. More specifically, the present application pertains to a Hall effect thruster with a propellant distributor and a discharge channel that are fabricated using additive manufacturing (or 3D printing) techniques, though other components of the thruster can be additively manufactured. Additive manufacturing processes can be beneficial when manufacturing a Hall effect thruster because of the complex geometry associated with the propellant distributor and the low-volume production requirements for the thruster. Additive manufacturing enables design simplifications in the Hall effect thruster that can potentially reduce manufacturing cost and time. One design simplification that can be realized using additive manufacturing is the separation of the propellant distributor from the anode and the detachable connection of the propellant distributor and the discharge channel. Another design simplification may be associated with the direct integration of the propellant distributor into the discharge channel. The design simplifications for the Hall effect thruster can reduce part count for the Hall effect thruster and can eliminate the baffle and orifice geometry inside of the anode.

The Hall effect thruster (or other electric propulsion thruster) with additively manufactured components can be designed and applied to small satellites (or sats), e.g., CubeSats, large spacecraft, and/or major telecommunications or science satellites. Additively manufacturing the thruster can also allow in-space fabrication and assembly of a thruster system, which can be beneficial for automated or manned space exploration.

An advantage of the present application is a reduction in the cost of component fabrication for selected components (e.g., the anode, propellant distributor and discharge channel) of the Hall effect thruster as compared to conventional designs and manufacturing.

Another advantage of the present application is that selected components (e.g., the discharge channel) of the Hall effect thruster can be manufactured and replaced at low-cost.

An additional advantage of the present application is that selected components of Hall effect thrusters can be fabricated with fast turnaround and high availability processes.

A further advantage of the present application is that multiple geometries for selected components of the Hall effect thruster can be fabricated and investigated that would be cost prohibitive to manufacture using traditional methods and materials.

Still another advantage of the present application is the availability of a wider range of thruster design options as a result of additive manufacturing that may provide for new and unique component level and thruster level designs and configurations.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
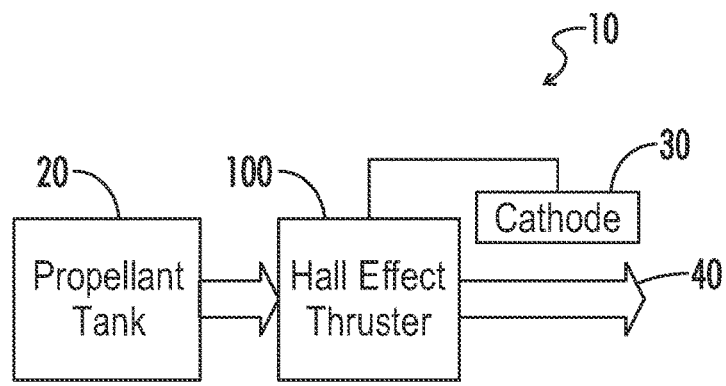
FIG. 1 is a block diagram of an embodiment of a propulsion system.

FIG. 1 shows an embodiment of a propulsion system. The propulsion system 10 can include a propellant tank 20 that stores a propellant. In one embodiment, the propellant can be a noble gas such as Xenon or Krypton, but other propellants can be used in other embodiments. The propellant tank 20 provides the propellant to an electric propulsion thruster 50, which generates plasma or ions 40 that provide the thrust for the propulsion system 10. In one embodiment, the thruster 50 can be a stationary plasma thruster (SPT) type Hall effect thruster, but other configurations of electric propulsion thrusters (e.g., a magnetoplasmadynamic (MPD) thruster or an annular ion engine (AIE)) can be used in other embodiments. In the embodiment shown in FIG. 1, a cathode 30 can be electrically connected to the thruster 50 and may receive propellant from the propellant tank 20. The cathode 30 can be an electron source used in the generation of the plasma 40 in the thruster 100. While the cathode 30 is shown separate from the thruster 50 in the embodiment of FIG. 1, the cathode 30 may be incorporated into the thruster 50 in other embodiments. In other embodiments, the cathode 30 may not be required depending on the type of electric propulsion thruster 50 used in the propulsion system 10.

Figure 2:
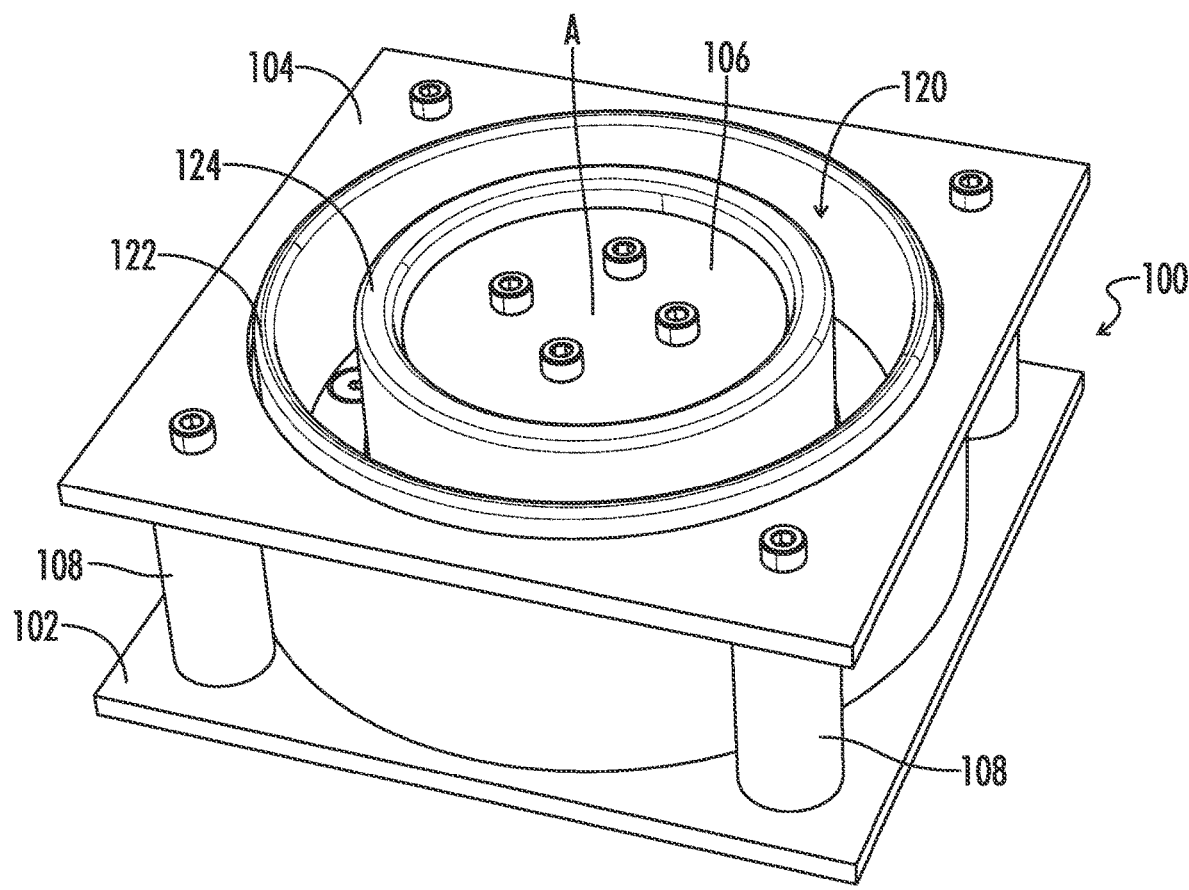
FIG. 2 is a perspective view of an embodiment of a Hall effect thruster from the propellant distribution system of FIG. 1.
Figure 3:
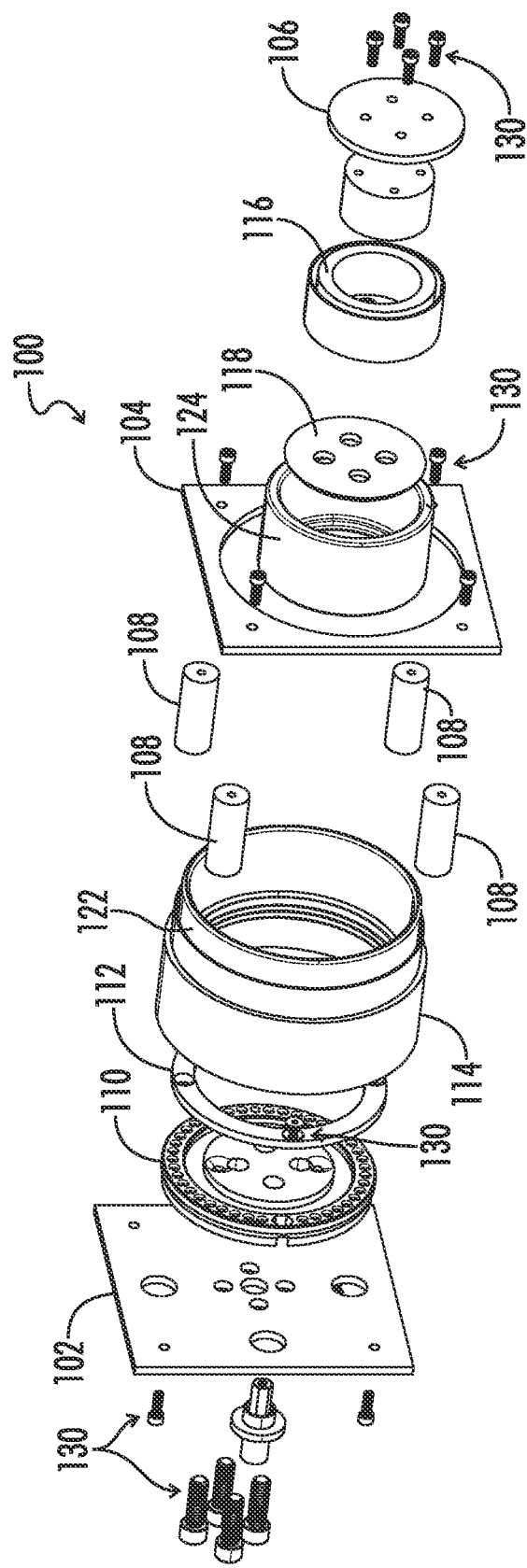
FIG. 3 is an exploded view of the Hall effect thruster of FIG. 2.

FIGS. 2 and 3 show an embodiment of an electric propulsion thruster from the propulsion system 10. The electric propulsion thruster can be a Hall effect thruster 100 that can have a central axis A and can include a rear magnetic pole 102 and a front outer magnetic pole 104 at opposed ends of the thruster 100. A front inner magnetic pole 106 can be positioned within an aperture of the front outer magnetic pole 104. In one embodiment, a planar surface of the front inner magnetic pole 106 can be substantially co-planar with a planar surface of the front outer magnetic pole 104, but the planar surface of the front inner magnetic pole 106 may be axially offset from the planar surface of the front outer magnetic pole 104 in other embodiments. Outer magnetic poles 108 can be used to connect the rear magnetic pole 102 and the front outer magnetic pole 104. In one embodiment, the rear magnetic pole 102, the front outer magnetic pole 104, the front inner magnetic pole 106 and the outer magnetic poles can be machined from 1018 steel and may have simple shapes that can be easily machined from stock plates and rods.

The thruster 100 can have a propellant distributor 110 positioned between the rear magnetic pole 102 and an anode 112. In one embodiment, the anode 112 can be a solid ring manufactured from stainless steel. However, the anode 112 can incorporate other configurations and materials in other embodiments. An annular or cylindrical discharge channel 120 can extend from the propellant distributor 110 to (and possibly beyond) the front outer magnetic pole 104. The discharge channel 120 can include an outer annular wall 122 and an inner annular wall 124. Each of the propellant distributor 110, the outer annular wall 122, and the inner annular wall 124 can be fabricated using additive manufacturing. In one embodiment, the propellant distributor 110, the outer annular wall 122 and/or the inner annular wall 124 can be fabricated from one of polyetherimide (e.g., ULTEM®), ceramic, or acrylonitrile butadiene styrene (ABS). The propellant distributor 110, the outer annular wall 122 and the inner annular wall 124 can each be individually fabricated from different materials (e.g., polyetherimide, ceramic, or ABS) or the propellant distributor 110, the outer annular wall 122 and the inner annular wall 124 can be collectively fabricated from the same material (e.g., polyetherimide, ceramic, or ABS). However, in other embodiments, the outer annular wall 122, the inner annular wall 124 and the propellant distributor 110 may be fabricated (either individually or collectively) from materials different from the materials identified above (e.g., other suitable dielectric materials).

An outer electromagnet 114 can be positioned between the rear magnetic pole 102 and the front outer magnetic pole 104 and can be positioned near the exterior surface of the outer annular wall 122 of the discharge channel 120. In other words, the outer electromagnet 114 can circumferentially surround the discharge channel 120. An inner electromagnet 116 can be positioned between the rear magnetic pole 102 and the front inner magnetic pole 106 and can be positioned near the exterior surface of the inner annular wall 124 of the discharge channel 120. In other words, the discharge channel 120 can circumferentially surround the inner electromagnet 116. In one embodiment, the rear magnetic pole 102, the front outer magnetic pole 104, the front inner magnetic pole 106 and the outer magnetic poles 108 can be used to guide the magnetic flux generated by the inner electromagnet 116 and the outer electromagnet 114. In the embodiment shown in FIG. 2, a spacer 118 can be used to position the inner electromagnet 116 within the thruster 100, but the spacer 118 may be omitted in other embodiments. The thruster 100 can also include mechanical fasteners 130 (e.g., bolts, screws, etc.) to connect the components of the thruster 100 together. In other embodiments, the mechanical fasteners 130 may be removed and multiple components can be additively manufactured as a single component with either multiple varying materials or the same material. In an embodiment, the fasteners 130 connecting the rear magnetic pole 102 and the front inner magnetic pole 106 may also operate to connect the inner and outer magnetic circuits and function as a flux guide. The fasteners 130 connecting the rear magnetic pole 102 and the front inner magnetic pole 106 may provide a conduction path for magnetic field lines and be large, low carbon-steel fasteners.

Figure 4:
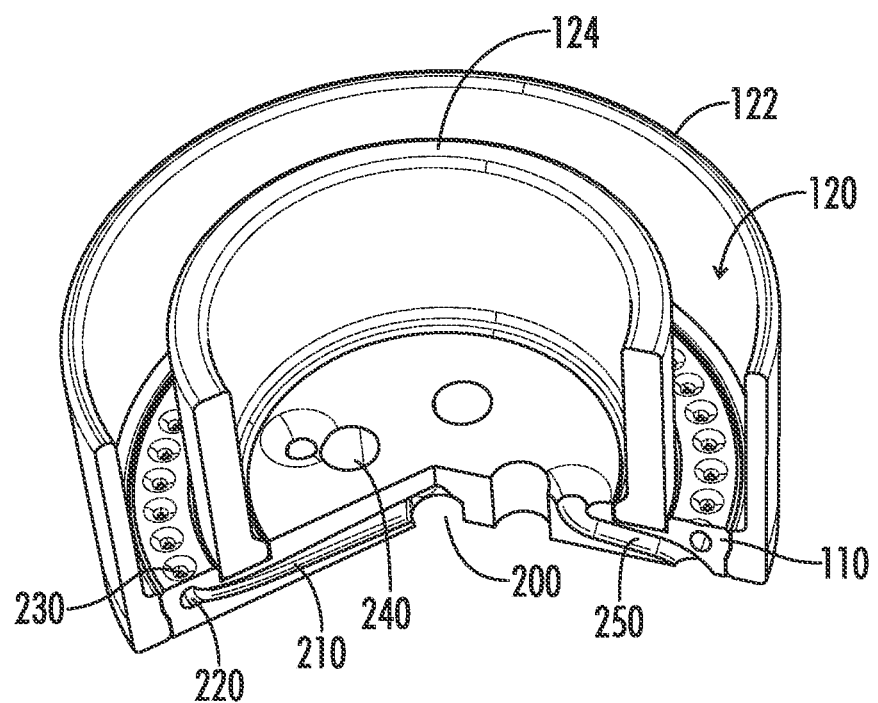
FIG. 4 is a cross-sectional view of an embodiment of the additively manufactured propellant distributor and discharge channel of a Hall effect thruster.

FIG. 4 shows a cross-sectional view of the propellant distributor 110 and discharge channel 120. The propellant distributor 110 can include one or more inlet openings 200 to receive propellant from the propellant tank 20. While the inlet opening 200 is shown in the center of a planar surface of the propellant distributor 110 in the embodiment of FIG. 4, the propellant distributor 110 may also have inlet openings 200 in a radial surface (e.g., an outer wall of the propellant distributor 110) in other embodiments. The propellant can then flow from the inlet opening 200 via one or more radial passageways 210 to one or more annular passageways 220 located near the edge of the propellant distributor 110. In an embodiment, if the propellant distributor 110 has an inlet opening 200 in a radial wall, the one or more annular passageways 220 may be directly connected to the inlet opening 200. The annular passageways 220 can then be used to distribute the propellant to discharge holes 230 that supply the propellant to the discharge channel 120. The discharge holes 230 can be positioned around the circumference of the propellant distributor 110 to provide for a substantially even distribution of propellant into the discharge channel 120. In another embodiment, the discharge holes 230 can also be placed circumferentially along the annular walls 122, 124 to provide lateral propellant injection or staggered injection into the discharge channel 120 as may be dictated by the design and operation of the thruster 100. In a further embodiment, propellant passageways 210 can be embedded to flow through the annular walls 122, 124 and body of the propellant distributor 110 to provided cooling to the annular walls 122, 124 and the propellant distributor 110.

The propellant distributor 110 can also include one or more mounting holes 240 to receive fasteners 130. The location of the mounting holes 240 in the propellant distributor 110 can result in the need for multiple radial passageways 210 (e.g., 4 radial passageways 210) from the inlet 200 in order to provide propellant to the annular passageways 220. In addition, the location of mounting holes (not shown) for the anode 112 in the propellant distributor 110 can result in the need for multiple annular passageways 220 (e.g., 2 or 4 annular passageways 220) and the omission (or relocation) of some of the discharge holes 230 along the circumference of the propellant distributor 110. In other embodiments, using additive manufacturing, the anode 112 may be an integrated as part of the inner annular wall 124, the outer annular wall 122, the propellant distributor 110, or as a part extruded from the annular walls 122, 124 or the propellant distributor 110 into the discharge channel 120. The propellant distributor 110, inner annular wall 124 and outer annular wall 122 may also include one or more wire passageways 250 to enable corresponding wiring for the electromagnets and/or the magnetic poles to pass through the propellant distributor 110, the inner annular wall 124 and/or the outer annular wall 122.

In one embodiment, the outer annular wall 122 can have an outer diameter of about 78 mm (millimeters), the discharge channel 120 can have a width of about 11.6 mm and the discharge channel 120 can have a depth (to the face of the anode 112 (not shown in FIG. 4)) of about 18.2 mm. The discharge holes 230 can have a diameter of 0.254 mm (0.01 in) in an embodiment. However, in other embodiments, other dimensions can be used for the width of the discharge channel 120, the diameter of the discharge holes 230 and the diameter of the outer annular wall 122.

FIGS. 5-8 show different possible configurations of the propellant distributor 110 and the discharge channel 120 in thruster 100. In the embodiment of the thruster 100 shown in FIG. 5, the propellant distributor 110 and the discharge channel 120 are fabricated as a monolithic component (i.e., a single component) using additive manufacturing techniques to reduce part count. The propellant distributor 110 can be integrated into the base of the discharge channel 120 and be separated from the anode 112. Thus, the anode 112 can be manufactured as a stainless steel ring in the embodiments of FIGS. 5-8. In other embodiments, the anode 112 can be fabricated as part of the discharge channel 120 using additive manufacturing, further reducing part count and the need for mechanical fasteners 130.

Figure 5:
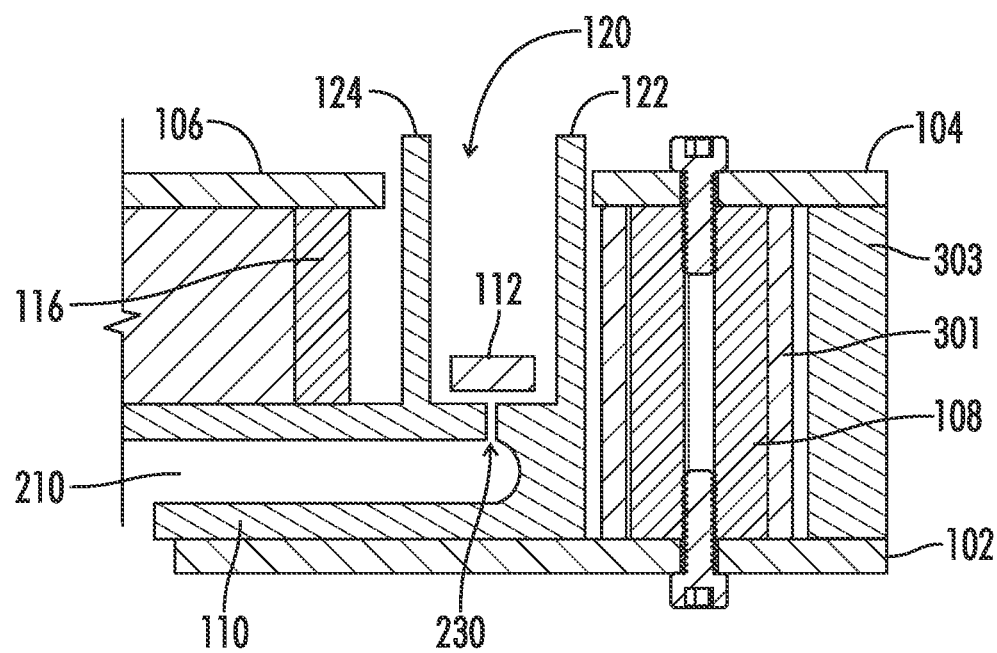
FIGS. 5-8 are partial cross-sectional views of different embodiments of a Hall effect thruster.

In addition, the thruster 100 may also include four (4) electromagnets 301 wrapped around the outer magnetic poles 108 in place of the outer electromagnet 114. In other embodiments, the electromagnets 116 and 301 can be replaced with permanent magnets, either as separate components manually assembled into the thruster 100, or directly fabricated, with additive manufacturing, as part of the magnetic poles 106 and 108. In one embodiment, the electromagnets 301 may be manufactured from magnet wire. Further, the inner electromagnet 116 and the four electromagnets 301 can be electrically coupled together in a single circuit. In the embodiment of FIG. 5, the propellant distributor 110, the inner annular wall 124 and the outer annular wall 122 can be fabricated (as a single component) from polymers or ceramics with additive manufacturing. The thruster 100 can further include a cover 303 for the electromagnets 301. The cover 303 may be fabricated from polymer or ceramics and can be either separate from or integral with the single component for the propellant distributor 110, the inner annular wall 124 and the outer annular wall 122.

Figure 6:
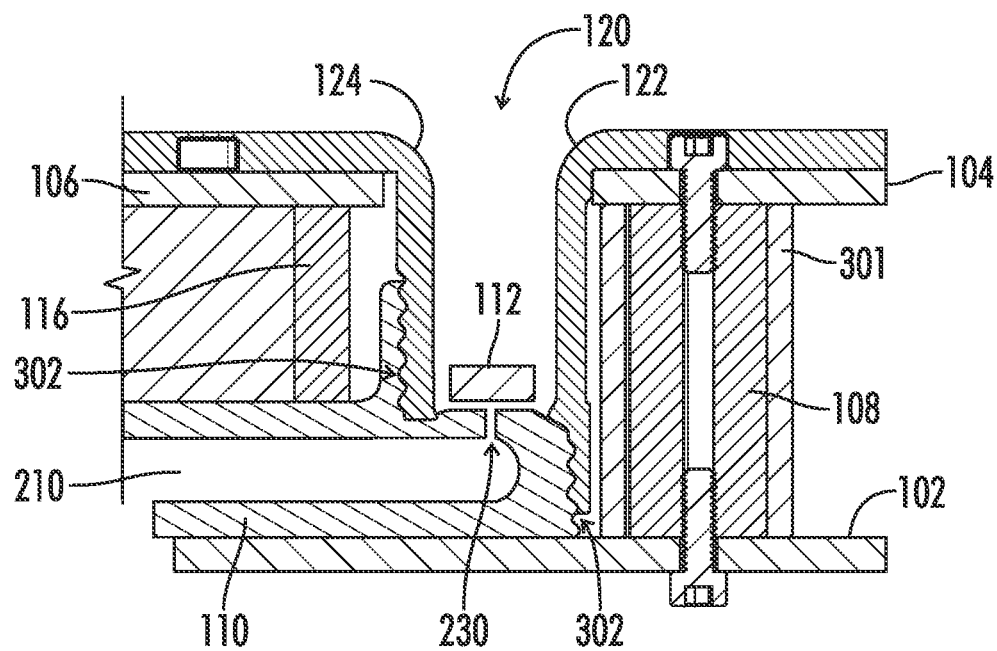

In the embodiment of the thruster 100 shown in FIG. 6, the propellant distributor 110 and the discharge channel 120 can be manufactured as separated components and detachably connected together (e.g., the discharge channel 120 can be detached and reattached to the propellant distributor 110). The propellant distributor 110 and the discharge channel 120 can be fabricated as separate components to facilitate disassembly and replacement of the discharge channel 120 (without having to replace the propellant distributor 110) which may degrade faster than the propellant distributor 110 due to heating near the exit plane for the discharge channel 120. In addition, the separation of the discharge channel 120 from the propellant distributor 110 also permits the discharge channel 120 to be fabricated from different materials in order to improve the service lifetime, performance or behavior of the Hall effect thruster 100.

As shown in FIG. 6, the inner annular wall 124 and the outer annular wall 122 can each be detachably connected to the propellant distributor 110 by a threaded connection 302. In one embodiment, for ease in assembling the thruster 100, the inner annular wall 124 and the outer annular wall 122 can be connected to the propellant distributor 110 before other components of the thruster 100 are assembled. In addition, the outer annular wall 122 and the inner annular wall 124 can be extended radially from an end to include a pole cover for the front outer magnetic pole 104 and the front inner magnetic pole 106.

Figure 7:
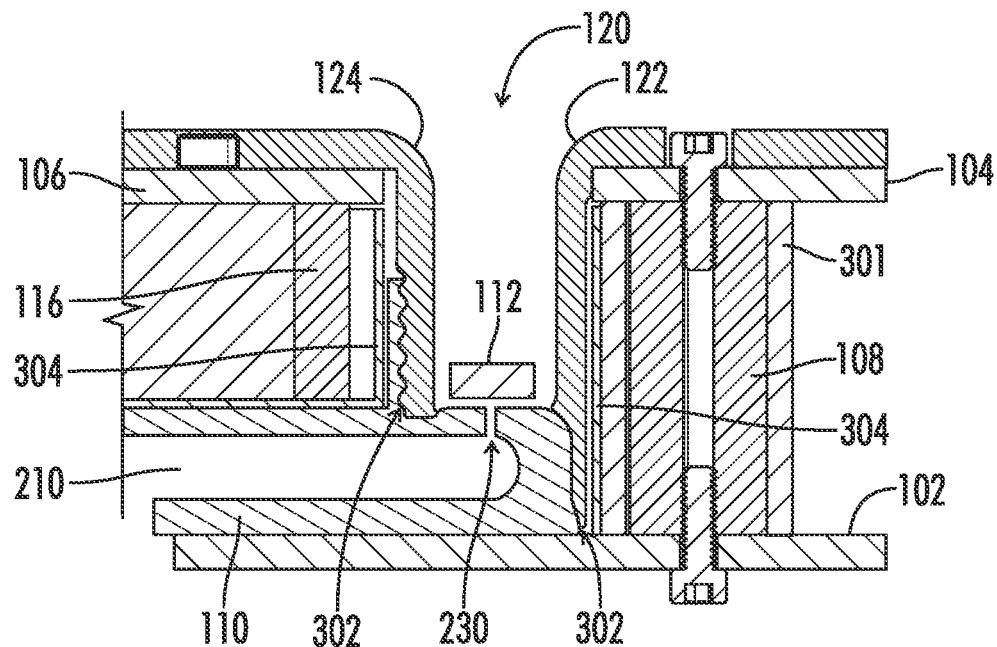

The embodiment of the thruster 100 shown in FIG. 7 is similar to the embodiment shown in FIG. 6, except that magnetic screens 304 are positioned between the inner electromagnet 116 and the inner annular wall 124 of the discharge channel 120 and the electromagnets 301 and the outer annular wall 122 of the discharge channel 120. The magnetic screens 304 can reduce electron current losses to the anode 112. In one embodiment, the magnetic screens 304 can be manufactured from 1010 carbon steel. The thruster 100 can also include an increased gap clearance between the anode 112 and the surface of the propellant distributor 110 to enhance propellant flow around the anode 112.

Figure 8:
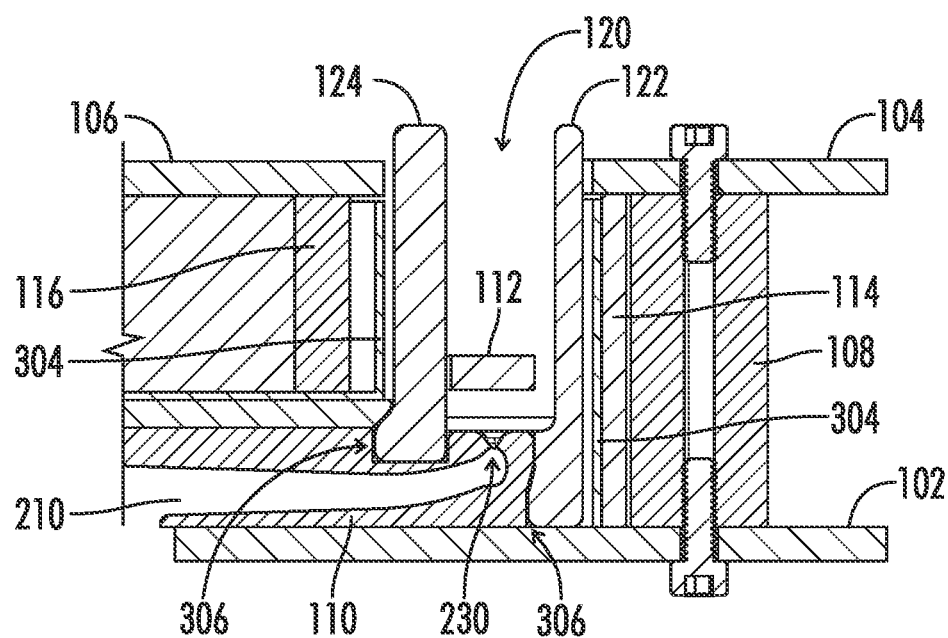

In the embodiment of the thruster 100 shown in FIG. 8, the propellant distributor 110 and the discharge channel 120 can be manufactured as separated components and detachably connected together. The thruster 100 shown in FIG. 8 may have a similar arrangement to the thruster 100 shown in FIGS. 2-3. As shown in FIG. 8, the inner annular wall 124 and the outer annular wall 122 can each be connected to the propellant distributor 110 by a "snap-fit" connection 306. In addition, the outer annular wall 122 and the inner annular wall 124 do not include pole covers (as used in the embodiments of FIGS. 6-7). In one embodiment, the inner annular wall 124 can be fabricated from glazed ceramic in place of ABS (as used in the embodiment of FIG. 5) and the outer annular wall 122 can be fabricated from polyetherimide in place of ABS (as used in the embodiment of FIG. 5). In one embodiment, the additively manufactured ceramic for the inner annular wall 124 may not be hot-pressed, and therefore, have to undergo a firing and glazing process after fabrication to reach the finished state. The firing process may induce part shrinkage on the order of 3% of total part size and must be accounted for in the design of the inner annular wall 124. In other embodiments, the annular walls 122, 124 along with the propellant distributors 110 may be fabricated with other polymer, ceramic, or composite materials using additive manufacturing. In an embodiment, the specific configurations of the propellant distributor 110 and the annular walls 122, 124 may be modified from the versions shown in FIGS. 5-7 to accommodate one or more limitations imposed by additively manufacturing the inner annular wall 124 using ceramic processes. For example, the geometry of the propellant distributor 110 in FIG. 8 can be adjusted to provide clearance for the "foot" at the bottom of the inner annular wall 124 that is used to secure the inner annular wall 124 to the propellant distributor 110 via the snap-fit connection.

The four electromagnets 301 (as used in the embodiments of FIGS. 5-7) can be replaced with the outer electromagnet 114 that is positioned around the outer magnetic screen 304 to increase the strength of the outer magnetic field for the thruster 100. Further, the inner electromagnet 116 and the outer electromagnet 114 can be electrically connected to different circuits that permit the currents provided to the inner electromagnet 116 and the outer electromagnet 114 to be set with two different supplies. The thruster 100 can also include an increased gap clearance between the anode 112 and the surface of the propellant distributor 110 to enhance propellant flow around the anode 112.

The thruster 100 shown in FIG. 8 can also include enhancements to the shape of the inlet 200, radial passageway 210, the annular passageway 220 and the discharge holes 230 to obtain a desired propellant flow. For example, the discharge holes 230 may incorporate a constricted section to obtain a reduced pressure for the propellant exiting the discharge hole 230 via the Venturi effect. In another example, one or more of the inlet 200, radial passageway 210, the annular passageway 220 and the discharge holes 230 can be designed to obtain different flow patterns (e.g., rotating flow as opposed to laminar flow) or turbulence in the discharge channel 120.

In operation, the thruster 100 shown in FIG. 8, which can be similar to the thruster 100 shown in FIGS. 2 and 3, can receive propellant from the propellant tank 20. The propellant can enter the propellant distributor 110 via inlet opening 200 and flow in the radial passageways 210 from the inlet opening 200 to the annular passageways 220. From the annular passageways 220, the propellant can enter the discharge channel 120 through the discharge holes 230.

Figure 9:
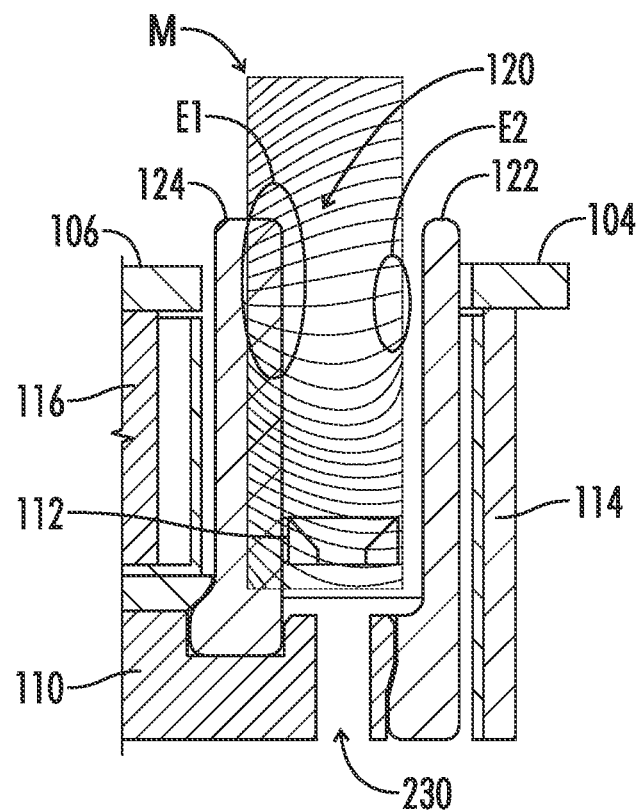
FIG. 9 shows an embodiment of the radial magnetic field for a Hall effect thruster similar to the one shown in FIG. 8.

Once the propellant enters the discharge channel 120, the propellant can be ionized by electrons from the cathode 30 to form plasma 40. The electrons from the cathode 30 are drawn into the discharge channel 120 and toward the anode 112, which is a positive electrode. A radial magnetic field M (see FIG. 9) formed by the inner electromagnet 116 and the outer electromagnet 114 can "trap" (or hold) the electrons in the discharge channel 120 and prevent the electrons from reaching the anode 112. In an embodiment, the electrons can collect in areas E1 and E2 (see FIG. 9) near the exit (or end) of the discharge channel 120.

The areas E1 and E2 of high electron density can cause ionization collisions with the propellant atoms flowing from the discharge channel 120. When the propellant atom collides with the electron, the propellant atom becomes ionized (e.g., a positive ion) and an additional electron is gained, thereby forming plasma 40. The positive ions can then be repelled from the anode 112 and accelerated toward the cathode 30 due to the negative charge associated with the cathode 30.

In an embodiment, a Hall effect thruster can be manufactured using both additively manufactured components and traditionally manufactured components. In other embodiments, all of the components for a Hall effect thruster may be manufactured using additive manufacturing techniques. The discharge channel 120 and the propellant distributor 110 may be fabricated using additive manufacturing techniques and the other components of the Hall effect thruster 100 may be manufactured using conventional techniques. In an embodiment, separate 3D printers can be used for the fabrication of the outer channel wall 122 (made from polyetherimide) and the propellant distributor 110 (made from ABS). In addition, a third 3D printer may be used for the fabrication of the inner channel wall 124 (made from ceramic). In other embodiments, the entire thruster may be manufactured with a single multi-material machine.

Next, the discharge channel 120 and the propellant distributor 110 may be connected together. The inner channel wall 124 and the outer channel wall 122 can be detachably connected to the propellant distributor 110. The propellant distributor 110 and the discharge channel 120 can be positioned (and possibly connected to) the rear magnetic pole 102. The magnetic screen 304 and the inner electromagnet 116 can be placed in the interior space that is enclosed by the discharge channel 120. The magnetic screen 304 can be placed adjacent to the inner channel wall 124 and the inner electromagnet 116 can be placed next to the magnetic screen 304 and opposite the inner channel wall 124. A spacer 118 (if used) and the front inner magnetic pole 106 can be positioned in the interior space that is enclosed by the discharge channel 120 and fasteners 130 can be used to connect the front inner magnetic pole 106 to the rear magnetic pole 102.

The outer magnetic poles 108, a magnetic screen 304 and the outer electromagnet 114 can be placed in the surrounding space outside of the discharge channel 120. The magnetic screen 304 can be placed adjacent to the outer channel wall 122 and the outer electromagnet 114 can be placed next to the magnetic screen 304 and opposite the outer channel wall 122. The outer magnetic poles 108 can be positioned adjacent to the outer electromagnet 114. The front outer magnetic pole 104 can be positioned near the exit of the discharge channel 120 and fasteners 130 can be used to connect the front outer magnetic pole 104 to the rear magnetic pole 102 via the outer magnetic poles 108. In other embodiments, the specific order in which components are positioned and/or connected in the thruster 100 can be varied in order to obtain manufacturing efficiencies.

In an embodiment, the thruster 100 may be operated with a discharge voltage of between 180-260 volts (V), a power of between 280-520 watts (VV), a thrust of between 17-30 millinewtons (mN), an anode specific impulse (anode $I_{sp}$) of between 870-1450 seconds (s) and an anode efficiency of between 27-42%.

In an embodiment, one or both of the inner electromagnet 116 or the outer electromagnet 114 may be replaced by magnets fabricated using additive manufacturing techniques. For example, polymer-bonded magnets may be fabricated and used in place of the inner electromagnet 116 or the outer electromagnet 114. The size of fabricated polymer-bonded magnets used in place of the inner electromagnet 116 or the outer electromagnet 114 may have to be adjusted to obtain the appropriate magnetic field intensities for the thruster 100.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A Hall effect thruster comprising:
   at least one electromagnet configured to generate a magnetic field;
   at least two magnetic poles comprising a first magnetic pole and a second magnetic pole, the first magnetic pole and the second magnetic pole positioned on opposed sides of the at least one electromagnet;
   a discharge channel, the discharge channel having an annular or cylindrical shape and configured to extend from the first magnetic pole to the second magnetic pole;
   a propellant distributor connected to the discharge channel, the propellant distributor is a dielectric material and is configured to form a base of the discharge channel, wherein the propellant distributor comprises a plurality of outlets through the dielectric material and is further configured to provide propellant into the discharge channel; and
   an anode positioned in the discharge channel, wherein the anode is a conductor and is a separate component from the propellant distributor.

2. The Hall effect thruster of claim 1, wherein the propellant distributor and the discharge channel are fabricated using additive manufacturing techniques.

3. The Hall effect thruster of claim 2, wherein the propellant distributor and the discharge channel each comprise one or more of glazed ceramic, polyetherimide, acrylonitrile butadiene styrene, or other dielectric material.

4. The Hall effect thruster of claim 1, wherein the anode comprises a solid ring.

5. The Hall effect thruster of claim 4, wherein the anode comprises stainless steel.

6. The Hall effect thruster of claim 1, wherein the discharge channel comprises an inner annular wall and an outer annular wall, wherein each of the inner annular wall and the outer annular wall are connected to the propellant distributor.

7. The Hall effect thruster of claim 6, wherein each of the inner annular wall and the outer annular wall is connected to the propellant distributor by one of a threaded connection or a snap-fit connection.

8. The Hall effect thruster of claim 6, wherein the inner annular wall comprises a first material and the outer annular wall comprises a second material different from the first material.

9. The Hall effect thruster of claim 1, wherein the plurality of outlets are circumferentially positioned on a planar surface of the propellant distributor adjacent an outer edge of the propellant distributor.

10. The Hall effect thruster of claim 9, wherein the plurality of outlets are connected to at least one annular passageway extending through an interior portion of the propellant distributor.

11. The Hall effect thruster of claim 10, wherein the at least one annular passageway is connected to an inlet, the inlet configured to receive propellant from a propellant tank.

12. The Hall effect thruster of claim 11, wherein the inlet is located in at least one of a wall of the propellant distributor or another planar surface of the propellant distributor opposite the plurality of discharge holes.

13. The Hall effect thruster of claim 10, wherein the at least one annular passageway is connected to a plurality of radial passageways extending through an interior portion of the propellant distributor.

14. The Hall effect thruster of claim 1, wherein the discharge channel is a first material and the dielectric material of the propellant distributor is different from the first material.

15. The Hall effect thruster of claim 1, wherein the discharge channel comprises at least one propellant passageway extending through an interior portion of the discharge channel such that flow of propellant through the at least one propellant passageway cools the discharge channel.

16. The Hall effect thruster of claim 15, wherein the discharge channel has a plurality of discharge holes connected to the at least one propellant passageway such that propellant flows into the discharge channel.

17. The Hall effect thruster of claim 1, wherein the propellant distributor is positioned on the first magnetic pole.

18. The Hall effect thruster of claim 1, wherein the propellant distributor comprises:
   an inlet configured to receive propellant from a propellant tank and wherein the inlet is positioned at a central location of the propellant distributor; and
   at least one annular passageway extending through an interior portion of the propellant distributor and in fluid communication with the plurality of outlets, the at least one annular passageway connected to the inlet by at least one radial passageway extending between the inlet and the at least one annular passageway.

19. An electric propulsion thruster comprising:
   at least one electromagnet configured to generate a magnetic field;
   at least two magnetic poles comprising a first magnetic pole and a second magnetic pole, the first magnetic pole and the second magnetic pole positioned on opposed sides of the at least one electromagnet;
   a discharge channel, the discharge channel having an annular or cylindrical shape and configured to extend from the first magnetic pole to the second magnetic pole, the discharge channel comprising an inner annular wall and an outer annular wall, wherein each of the inner annular wall and the outer annular wall are connected to the propellant distributor, and wherein the inner annular wall comprises glazed ceramic and the outer annular wall comprises polyetherimide;
   a propellant distributor connected to the discharge channel, the propellant distributor configured to form a base of the discharge channel; and
   an anode positioned in the discharge channel.

20. A propulsion system comprising:
   a propellant tank configured to store a propellant;
   a Hall effect thruster coupled to the propellant tank, the Hall effect thruster comprising:
      at least one electromagnet configured to generate a magnetic field;
      at least two magnetic poles, the at least two magnetic poles comprising a first magnetic pole and a second magnetic pole, the first magnetic pole and the second magnetic pole positioned on opposed sides of the at least one electromagnet;
      a discharge channel, the discharge channel having an annular shape and configured to extend from the first magnetic pole to the second magnetic pole;
      a propellant distributor connected to the discharge channel adjacent the first magnetic pole, at least one of the discharge channel or the propellant distributor is manufactured from a dielectric material, the propellant distributor configured to form a base of the discharge channel, wherein the propellant distributor comprises a plurality of outlets and is further configured to receive the propellant from the propellant tank and provide the propellant to the discharge channel; and an anode positioned in the discharge channel, wherein the anode is manufactured from a conductor and is a separate component from the propellant distributor; and a cathode electrically coupled to the Hall effect thruster and positioned near an exit of the discharge channel.

21. The propulsion system of claim 20, wherein the discharge channel comprises an inner annular wall and an outer annular wall and each of the inner annular wall and the outer annular wall is connected to the propellant distributor by one of a threaded connection or a snap-fit connection.

22. The propulsion system of claim 20, wherein the propellant distributor comprises an inlet configured to receive the propellant from the propellant tank and wherein the inlet is positioned at a central location of the propellant distributor.

23. The propulsion system of claim 20, wherein the plurality of outlets are circumferentially positioned on a planar surface adjacent an outer edge of the propellant distributor, wherein the plurality of discharge holes are connected to the inlet and configured to provide the propellant to the discharge channel.

24. The propulsion system of claim 20, wherein the propellant is one of Xenon or Krypton.

25. A method for manufacturing a Hall effect thruster, the method comprising:
    additively manufacturing a discharge channel, wherein the discharge channel has an annular shape;
    additively manufacturing a propellant distributor, wherein in at least one of the discharge channel or the propellant distributor is additively manufactured from a dielectric material, wherein the propellant distributor comprises a plurality of outlets and is further configured to provide propellant into the discharge channel;
    connecting the discharge channel to the propellant distributor;
    manufacturing an anode, wherein the anode is manufactured from a conductor;
    positioning an anode in the discharge channel, wherein the anode is a separate component from the propellant distributor;
    positioning the propellant distributor and the discharge channel between a first magnetic pole and a second magnetic pole;
    positioning at least one electromagnet between the first magnetic pole and the second magnetic pole; and
    coupling the first magnetic pole and the second magnetic pole.

26. A method for manufacturing a Hall effect thruster, the method comprising:
    additively manufacturing a discharge channel, wherein the discharge channel has an annular shape, the additively manufacturing a discharge channel includes additively manufacturing an outer annular wall with a first 3D printer using polyetherimide;
    additively manufacturing a propellant distributor, the additively manufacturing a propellant distributor includes additively manufacturing the propellant distributor with a second 3D printer using acrylonitrile butadiene styrene;
    connecting the discharge channel to the propellant distributor;
    positioning the propellant distributor and the discharge channel between a first magnetic pole and a second magnetic pole;
    positioning at least one electromagnet between the first magnetic pole and the second magnetic pole; and
    coupling the first magnetic pole and the second magnetic pole.

27. The method of claim 25, wherein connecting the discharge channel to the propellant distributor includes:
    connecting an inner annular wall of the discharge channel to the propellant distributor using a snap-fit connection; and
    connecting an outer annular wall of the discharge channel to the propellant distributor using a snap-fit connection.

28. An electric propulsion thruster comprising:
    at least one electromagnet configured to generate a magnetic field;
    at least two magnetic poles comprising a first magnetic pole and a second magnetic pole, the first magnetic pole and the second magnetic pole positioned on opposed sides of the at least one electromagnet;
    a discharge channel, the discharge channel having an annular or cylindrical shape and configured to extend from the first magnetic pole to the second magnetic pole;
    a propellant distributor connected to the discharge channel, the propellant distributor configured to form a base of the discharge channel, wherein the propellant distributor comprises a plurality of discharge holes circumferentially positioned on a planar surface adjacent an outer edge of the propellant distributor and wherein each discharge hole of the plurality of discharge holes has a constricted section configured to obtain a reduced pressure of propellant exiting the discharge hole; and
    an anode positioned in the discharge channel, wherein the anode is separate from the propellant distributor.

* * * * *